INVENTORS.
Carl D. Andrysiak
Robert G. Foster
Gerald A. Levine
Max R. Montierth

June 1, 1971   C. D. ANDRYSIAK ET AL   3,582,301
METHOD FOR FORMING GLASS-CERAMIC HONEYCOMB STRUCTURES
Filed Oct. 7, 1968   2 Sheets-Sheet 2

INVENTORS.
Carl D. Andrysiak
Robert G. Foster
Gerald A. Levine
Max R. Montierth
BY
William D. Fisdick
AGENT United States Patent Office 3,582,301
Patented June 1, 1971

3,582,301
METHOD FOR FORMING GLASS-CERAMIC HONEYCOMB STRUCTURES
Carl D. Andrysiak, Painted Post, Robert G. Foster, Elmira, Gerald A. Levine, Corning, and Max R. Montierth, Big Flats, N.Y., assignors to Corning Glass Works, Corning, N.Y.
Filed Oct. 7, 1968, Ser. No. 765,466
Int. Cl. C03b 29/00, 23/20
U.S. Cl. 65—33
15 Claims

ABSTRACT OF THE DISCLOSURE

A method for forming honeycomb structures in which a plurality of multichanneled glass tubes are stacked together and heated to fuse the tubes together and partially to devitrify the tubes to form a semicrystalline body. The tubes are pressed together, while heating is effected by means of a hot gas which is passed through the channels in the tubes by a pressure differential which is maintained on opposite sides of the honeycomb structure.

BACKGROUND OF THE INVENTION

Honeycomb structures, i.e., structures having generally parallel channels extending therethrough and having high surface-to-weight ratios, have substantial use for such purposes as heat exchangers, radiators, catalyst carriers and filters. When such bodies are to be used under circumstances under which they are subjected to high temperatures or high thermal gradients, it is advantageous that they be formed of ceramic or semicrystalline materials.

In the past, a common method for forming small cellular ceramic or semicrystalline honeycomb bodies was that described in U.S. Pat. 3,112,184, issued to R. Z. Hollenbach. According to the process described in that patent, a particulate ceramic material and a binder are applied to each side of a flexible carrier, and the carrier is then corrugated. Subsequently, alternate layers of corrugated and flat coated carriers are juxtaposed to form a honeycomb body. The body is then heated to sinter the particles together and to burn out the carriers.

Although the process of the Hollenbach patent permits the formation of ceramic bodies in configurations previously difficult to obtain, the procses and the resultant product have certain shortcomings. The process is costly, due to the consumption of carrier material. Furthermore, since sintered ceramic bodies have lower strengths than those formed directly from melted raw materials, such bodies, particularly when in the form of thin-walled honeycombs, cannot be subjected to great mechanical strain. In addition, dimensional precision of such bodies is difficult to obtain.

Accordingly, it is an object of the present invention to provide a method for forming ceramic honeycomb structures which avoids the above-mentioned disadvantages.

SUMMARY OF THE INVENTION

According to the invention, a plurality of thermally fusible tubes are arranged in a bundle, and hot gas at a temperature high enough to permit the tubes to be fused together under pressure but low enough to avoid collapse of the tubes is passed through the tubes by the use of a vacuum. The bundle of tubes is subjected to a transverse compressive force to aid in fusing the tubes together.

DESCRIPTION OF THE PREFERRED EMBODIMENT

Figure 1:
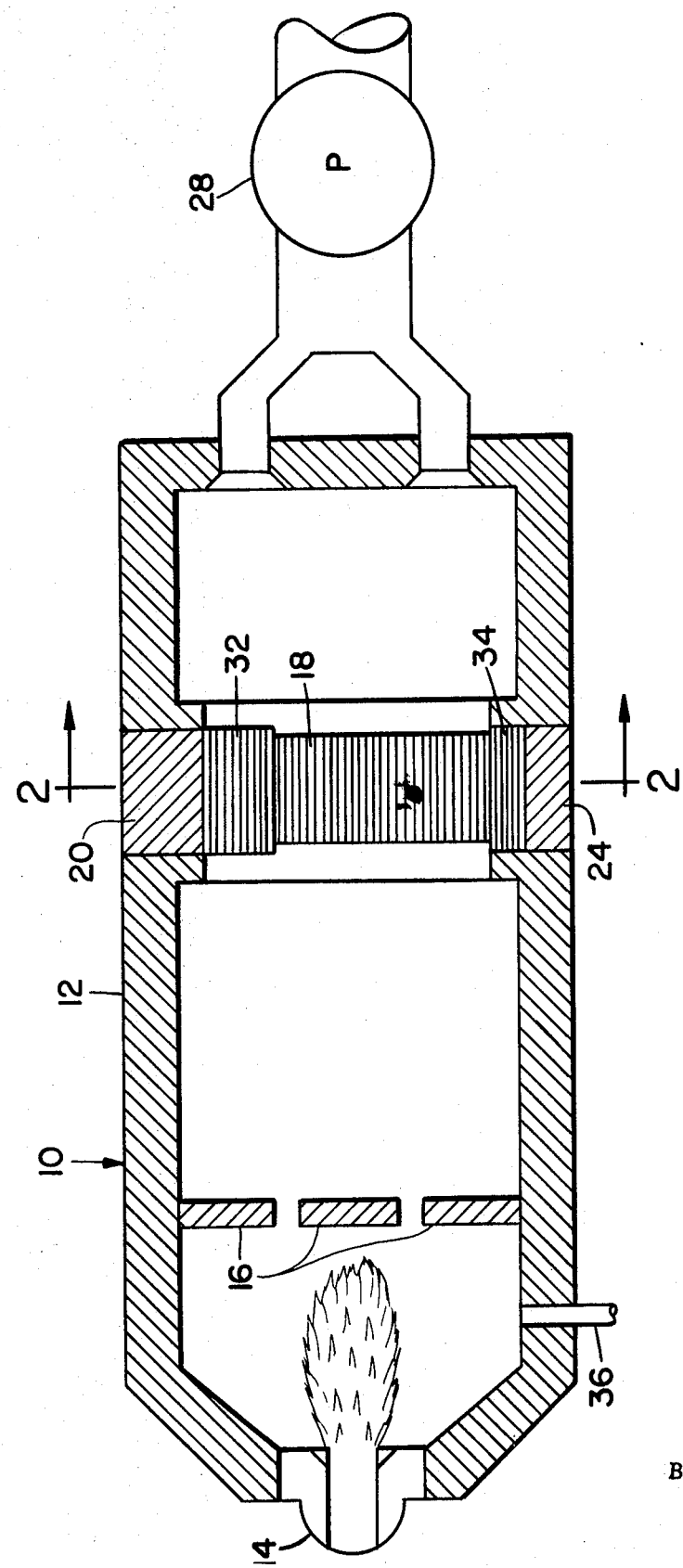
FIG. 1 is a longitudinal section view of a furnace for us in the present invention.
Figure 2:
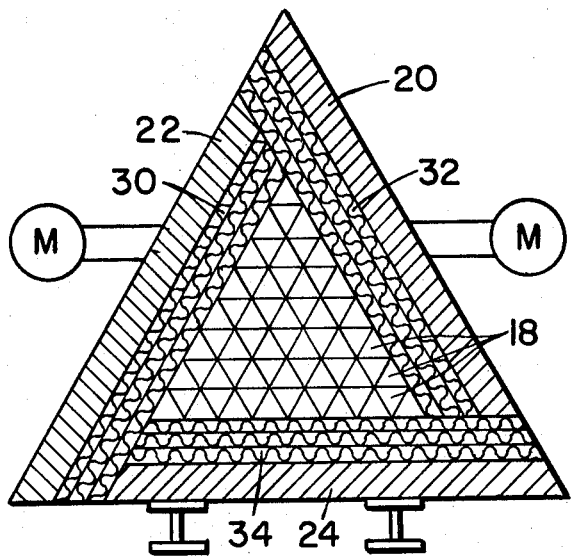
FIG. 2 is a sctional view taken on line 2—2 of FIG. 1.

Referring to the drawing, there is illustrated in FIGS. 1 and 2 a furnace 10 suitable for fusing and ceramming a plurality of multichannled glass tubes into a monolithic structure having a cross section in the form of an equilateral triangle. The furnace comprises a housing structure 12 having a cross section in the form of an equilateral triangle and having a gas-air burner 14 for supplying heated gas to the interior of the furnace. The furnace is provided with a series of baffles 16 for providing a relatively uniforn flow of heated gas. A large number of small multichanneled glass tubes 18 are supported within movable wall sections 20, 22 and 24, the wall sections being movable by means of motors M.

Figure 3:
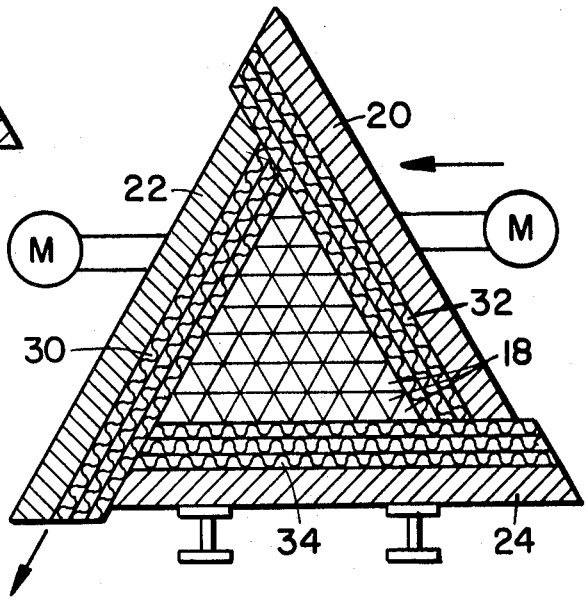
FIG. 3 is a view similar to that of FIG. 2, illustrating the furnace walls in modified position for compressing the bundle of tubes.
Figure 4:
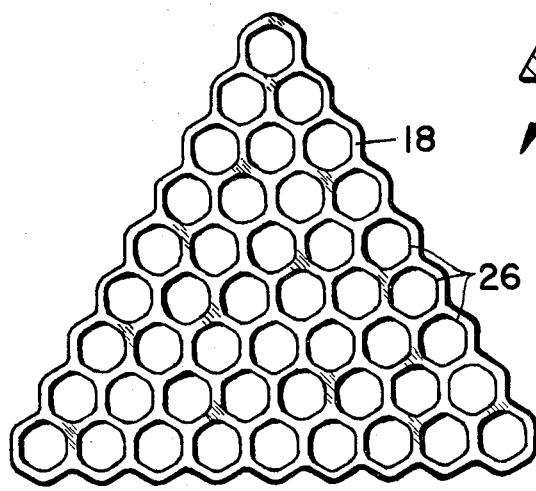
FIG. 4 is an end view of one of the individual tubes which are stacked in the furnace of FIGS. 1-3.

As illustrated in FIG. 4, each of tubes 18 has a cross section in the general form of an equilateral triangle and comprises a multiplicity of small generally hexagonal channels extending parallel to one another through the entire length of the tube. As heated gases are supplied to the furnace by burner 14, they are drawn through channels 26 of the triangular glass tubes by means of exhaust fan 28. Vacuum-induced gas flow is used in preference to pressure-induced flow in order to prevent the escape of hot gasses at the location of the seals between the stationary walls and the movable walls of the furnace. Flow rates are preferably regulated so that the portion of the furnace interior between the burner and the tubes is at atmospheric pressure. In this way not only is the loss of hot gas prevented but also the inflow on the upstream side of the tubes of cool air from the atmosphere is avoided. Such inflow would have a tendency to cool the tubes. Simultaneously with the passage of gas through the tubes, pressure is applied tranversely to the bundle of tubes by means of wall sections 20, 22 and 24. As shown in FIG. 3, wall section 24 is stationary, while each of wall sections 20 and 22 is movable in the direction indicated by the arrows, wall section 20 being movable in the direction of wall section 22 and parallel to the length of wall section 24 and wall section 22 being movable in the direction parallel to its length. In this way, the bundle of tubes is subjected to a compressive force which, along with their elevated temperature, results in fusion of the tubes together. In order that a substantially uniform temperature may be maintained across the bundle of tubes, there are located between the walls of the furnace and the tubes to be fused three layers 30, 32 and 34 of previously-formed rigid honeycomb material of a composition similar to that of the tubes being fused. The hot gas is passed through these layers as well as through the tubes to be fused, thus maintaining them at the same temperature as the tubes which are being fused and preventing heat loss from the edges of the bundle of tubes and the consequent cooler bundle edge portions which would result from contact with a cool furnace wall. Layers 30, 32 and 34 may be made in accordance with the present invention or in accordance with the process of the abovementioned Hollenbach patent.

Temperature control is achieved both by control of the gases supplied to burner 14 and by the injection of cool air through nozzle 36. Preferably the rate at which gases are withdrawn from the furnace by exhaust pump 28 is such that the pressures at all locations within the furnace are maintained at or below that of the atmosphere, thereby preventing the escape of hot gases and the attack of such gases on seals in the furnace walls.

Although the exact process parameters will vary depending upon such factors as the composition of the tubes and the size of the bundle being fused, the following is provided as an example of a specific combination of process parameters which permit the manufacture of superior honeycomb structures.

Tubes 18 may initially be formed of a glass comprising by weight 69.7% $SiO_2$, 17.8% $Al_2O_3$, 4.3% $Li_2O$, 3.1% BaO, 4.3% $TiO_2$ and 0.8% $As_2O_3$. The tubes may be those formed in accordance with the teachings of U.S. patent application Ser. No. 765,494 filed of even date herewith in the names of Carl D. Andrysiak and Richmond W. Wilson, entitled Method and Apparatus for Forming Multibore Tubing and assigned to the assignee of the present application. The tubes may have cross sections in the form of equilateral triangles and have 45 generally hexagonal channels having opposed sides spaced from one another by approximately .03 inch and wall thicknesses of about .004 inch. The tubes may be 4 inches in length and may be stacked in a bundle in the form of an equilateral triangle of 9½ inches in altitude. In order to fuse the tubes together, heat and gas are supplied by the burner to the furnace at a rate sufficient to raise the furnace temperature from room temperature to 750° C. in five minutes. Vacuum is applied at a rate sufficient to maintain a pressure drop of 15 inches of water across the bundle, and the bundle is simultaneously subjected to a compressive force of 300 pounds. The furnace is maintained at a temperature of 750° C. for 5 minutes with a pressure drop of 30 inches of water and subsequently raised to a temperature of 840° C. over a period of 1 minute. The temperature of the furnace is maintained at 840° C. until the tubes have been compressed sufficiently to reduce the altitude of the triangular bundle by 1 inch, at which time the compressive force on the bundle is reduced to 30 pounds. The furnace is subsequently cooled over a period of 25 minutes to a temperature of 75° C. At this point, the tubes are firmly fused to one another.

The fused bundle is next removed from the illustrated furnace and placed in a conventional kiln and heated at the rate of 240° C. per hour to 740° C. The bundle is held at this temperature for 3 hours and subsequently cooled to room temperature at the rate of 3° C. per minute. At this point, the nuclei necessary for subsequent formation of a glass-ceramic material have been formed.

Next, the fused and nucleated body is returned to the furnace illustrated in the drawing and brought over a period of 5 minutes to a temperature of 750° C. while being subjected to a compressive force of 30 pounds and a pressure drop of 15 inches of water between the faces of the body. The pressure drop is then increased to 30 inches of water, and the body is held at 750° C. for 5 minutes. Next, the temperature is increased from 750° C. to 1120° C. over a two-minute period and held at 1120° C. for 10 minutes. Subsequently, the body is cooled to room temperature over a fifteen-minute period. The flow of heated gas is then terminated, and the body is released from compression and removed from the furnace. The body is then heated in a kiln at the rate of 320° C. per hour to 1100° C. and maintained at that temperature for 2 hours. The temperature is then reduced at the rate of 320° C. per hour to a temperature of 1070° C. The structure is held at 1070° C. for 10 hours and then cooled to room temperature at the rate of 3° C. per minute. The resultant body may be cut to any desired shape for use in the production of the earlier-mentioned products.

Glass-ceramic honeycomb structures which are subjected to thermal cycling or high thermal gradients must exhibit low thermal expansions and fine grain size in order to be thermally shock resistant. Yet, it is desirable initially to form such structures from a glassy material in order to take advantage of the stress-relieving relatively low viscosity characteristics of glass. The ability to fuse tubes of glassy material depends upon the the ability to rapidly heat to, and cool from, the fusion temperature, such that the time at that temperature is sufficient to ensure fusion of the tubes but short enough to prevent flow-inhibiting crystallization of the glass, or any appreciable amount of nucleation. During the transformation from glass to glass-ceramic, breakage-producing thermal stresses result from both the liberation of thermal energy due to the exothermic crystallization reaction and volume changes due to transformation from glass to the denser crystalline phase. In the present process the rapidity of heating causes the formation of a low viscosity residual glass prior to the formation of any substantial amount of crystallization. Alternatively, the passage of gas through the channels of the honeycomb body helps to remove excess heat produced by crystallization, thereby avoiding abrupt thermal stresses.

The advantages of the present process, wherein hot gases are passed through a honeycomb structure, can be utilized not only in fusing tubes together to form honeycomb structures but also to effect transformation of previously-formed honeycomb structures from the glass to the semi-crystalline phase. For example, a single large multichanneled body might be drawn directly, and the passage of hot gas therethrough might be used only to effect nucleation and crystallization. In such case, hot gas can be passed through a honeycomb structure for a time and at a temperature sufficient to produce nucleation, and subsequently hot gas may be passed through a structure for a time and at a temperature sufficient to produce crystallization.

Further discussion of the nature and the manufacture of glass-ceramics suitable for the formation of glass-ceramic honeycomb structures may be found in U.S. patent application Ser. No. 765,467, filed of even date herewith in the names of David A. Duke, Max R. Montierth and Richard F. Reade, entitled Glass-Ceramic Articles and assigned to the assignee of the present application. A general discussion of the nature of glass-ceramics may be found in U.S. Pat. 2,920,971, issued to Stanley D. Stookey.

Although the present invention has particular utility in the formation of honeycomb structures of glass-ceramic materials, it will be understood that such structures may be constructed by the present process from other thermoplastic materials, such as glasses and ceramics.

Inasmuch as the foregoing description has been provided solely as that of a preferred embodiment of the invention, it is intended that the scope of the invention be limited only by the scope of the appended claims.

We claim:
1. The method of forming a honeycomb structure which comprises
 arranging in side-by-side relationship in a bundle, a plurality of thermally fusible tubes of thermoplastic material such as glasses and ceramics having open channels extending between their ends,
 passing through said channels of said tubes hot gas having a temperature high enough to heat said tubes to a temperature at which said tubes can be fused to one another under pressure but low enough to avoid collapse of said tubes, and
 exerting transverse force to press said tubes against one another and cause said tubes to fuse together.
2. The method according to claim 1 in which said hot gas is supplied to said bundle at one end thereof and is drawn through said bundle by means of a lower pressure at the other end of said bundle.
3. The method according to claim 1 in which said force is exerted against said bundle about its periphery by means of a honeycomb structure having channels parallel to the channels in said tubes, and simultaneously there is passed through said honeycomb structure hot gas at a temperature substantially the same as that of said gas which is passed through said tubes.
4. The method according to claim 3 in which said hot gas is supplied to said bundle at one end thereof and is drawn through said bundle by means of a lower pressure at the other end of said bundle.

5. The method according to claim 1 in which said bundle is formed from a plurality of glass tubes and said glass tubes are nucleated and subsequently partially devitrified to form a glass-ceramic body.

6. The method according to claim 5 in which said hot gas is supplied to said bundle at one end thereof and is drawn through said bundle by means of a lower pressure at the other end of said bundle.

7. The method according to claim 6 in which said force is exerted against said bundle about its periphery by means of a honeycomb structure having channels parallel to the channels in said tubes and simultaneously there is passed through said honeycomb structure a hot gas at a temperature substantially the same as that of the gas which is passed through said tubes.

8. The method according to claim 5 in which said force is exerted against said bundle about its periphery by means of a honeycomb structure having channels parallel to the channels in said tubes and simultaneously there is passed through said honeycomb structure hot gas at a temperature substantially the same as that of the gas which is passed through said tubes.

9. The method according to claim 8 in which said bundle of tubes is formed from a plurality of multichanneled glass tubes.

10. The method according to claim 1 in which said bundle of tubes is formed from a plurality of multichanneled glass tubes.

11. The method according to claim 1 in which said tubes are triangular in cross section.

12. The method according to claim 1 in which the flow of gas through said channels is induced by a partial vacuum on the downstream side thereof, and the area on the upstream side thereof is maintained at substantially atmospheric pressure.

13. In the method for transforming a glass honeycomb structure having open channels extending therethrough into a glass-ceramic honeycomb structure wherein said structure is heated to form nuclei for the growth of crystals and is subsequently heated in order to effect partial crystallization thereof, the improvement comprising heating said structure by passing hot gas completely through said open channels, and forcing said hot gas therethrough by maintaining a pressure differential on opposite sides of said honeycomb structure.

14. A method according to claim 13 which includes the step of passing said gas through said structure in a manner so as to raise said structure to a temperature at which viscous flow in said glass can relieve crystallization stresses prior to the formation of flow-inhibiting crystallization.

15. The method according to claim 13 which includes the step of passing said gas through said structure during the crystallization thereof at a rate sufficient to remove heat therefrom at a rate equivalent to the rate of production thereof by exothermic reaction of crystallization.

References Cited
UNITED STATES PATENTS

| | | | |
|---|---|---|---|
| 3,112,184 | 11/1963 | Hollenbach | 106—39 |
| 3,269,817 | 8/1966 | Bondley | 65—4 |

S. LEON BASHORE, Primary Examiner

S. R. FRIEDMAN, Assistant Examiner

U.S. Cl. X.R.

65—36